(12) United States Patent
Mathew et al.

(10) Patent No.: US 9,130,786 B2
(45) Date of Patent: Sep. 8, 2015

(54) DEVICE AND METHOD FOR COMPUTING A CHANNEL ESTIMATE

(71) Applicant: QUALCOMM Incorporated, San Diego, CA (US)

(72) Inventors: Deepak Mathew, Acton, MA (US); Ajay Anant Ingle, Austin, TX (US); Mao Zeng, Austin, TX (US); Marc M. Hoffman, Mansfield, MA (US)

(73) Assignee: Qualcomm Incorporated, San Diego, CA (US)

( * ) Notice: Subject to any disclaimer, the term of this patent is extended or adjusted under 35 U.S.C. 154(b) by 18 days.

(21) Appl. No.: 13/842,663

(22) Filed: Mar. 15, 2013

(65) Prior Publication Data

US 2014/0270017 A1    Sep. 18, 2014

(51) Int. Cl.
*H04B 1/00* (2006.01)
*H04L 27/00* (2006.01)
*H04L 25/02* (2006.01)
*H04B 1/7075* (2011.01)
*H04B 1/7093* (2011.01)

(52) U.S. Cl.
CPC .......... *H04L 25/0212* (2013.01); *H04B 1/7093* (2013.01); *H04B 1/70752* (2013.01); *H04B 2201/70707* (2013.01)

(58) Field of Classification Search
USPC ......... 375/130–153, 219, 222, 295, 299, 300, 375/316, 362, 220, 240.26–240.28, 346, 375/347, 348, 354, 372
See application file for complete search history.

(56) References Cited

U.S. PATENT DOCUMENTS

| | | | |
|---|---|---|---|
| 4,933,952 A | 6/1990 | Albrieux et al. | |
| 5,931,893 A * | 8/1999 | Dent et al. | 708/422 |
| 6,069,915 A * | 5/2000 | Hulbert | 375/150 |
| 6,263,011 B1 * | 7/2001 | Paik et al. | 375/149 |
| 6,442,193 B1 * | 8/2002 | Hirsch | 375/147 |
| 6,813,262 B1 | 11/2004 | Lee et al. | |
| 7,039,134 B1 * | 5/2006 | Avital et al. | 375/343 |
| 7,362,790 B2 | 4/2008 | Cleveland | |
| 2001/0038667 A1 | 11/2001 | Urabe et al. | |
| 2003/0202569 A1 | 10/2003 | Kim et al. | |
| 2004/0004995 A1 * | 1/2004 | Boesel et al. | 375/130 |
| 2004/0131022 A1 | 7/2004 | Ito | |
| 2007/0255930 A1 * | 11/2007 | Hoffmann | 712/220 |
| 2009/0262789 A1 * | 10/2009 | Abraham et al. | 375/150 |
| 2010/0290506 A1 * | 11/2010 | Kerr et al. | 375/147 |
| 2013/0266099 A1 * | 10/2013 | McKown | 375/346 |

FOREIGN PATENT DOCUMENTS

| | | |
|---|---|---|
| WO | 2007071810 A1 | 6/2007 |
| WO | 2007102684 A1 | 9/2007 |

OTHER PUBLICATIONS

International Search Report and Written Opinion—PCT/US2014/024089—ISA/EPO—Jul. 7, 2014.

* cited by examiner

*Primary Examiner* — Linda Wong
(74) *Attorney, Agent, or Firm* — Toler Law Group, PC

(57) ABSTRACT

An apparatus includes selection logic configured to select a first subset of a first set of samples stored at a first set of registers. The first subset includes a first sample stored at a first register of the first set of registers and further includes a second sample stored at a second register of the first set of registers. The apparatus further includes shift logic configured to shift a second set of samples stored at a second set of registers. The apparatus further includes a channel estimator configured to generate a first value associated with a channel estimate based on the first subset and further based on a second subset of the shifted second set of samples.

26 Claims, 5 Drawing Sheets

_US 9,130,786 B2_

DEVICE AND METHOD FOR COMPUTING A CHANNEL ESTIMATE

I. FIELD

The present disclosure is generally related to electronic devices and techniques for operating electronic devices.

II. DESCRIPTION OF RELATED ART

Advances in technology have resulted in smaller and more powerful electronic devices. For example, there currently exist a variety of mobile devices, such as wireless telephones, personal digital assistants (PDAs), and paging devices. The mobile devices may be small, lightweight, and easily carried by users. Wireless telephones, such as cellular telephones and Internet Protocol (IP) telephones, can communicate voice and data packets over wireless networks. Further, many wireless telephones include other types of devices that are incorporated therein. For example, a wireless telephone can also include a digital still camera, a digital video camera, a digital recorder, and an audio file player. Also, wireless telephones can process executable instructions, including software applications, such as a web browser application, that can be used to access the Internet. As such, wireless telephones and other mobile devices can include significant computing capabilities.

Increasingly, users expect mobile devices to provide high (e.g. "fast") performance while also consuming low power (e.g., having long battery life). However, to enable such processing capabilities, the mobile devices may store and process a large number of instructions, which consumes power. Battery life may be conserved by reducing the number of the instructions or reducing the speed at which the instructions are processed. However, conserving battery life in this manner may slow performance of the mobile devices, frustrating users. Some mobile devices use scalar hardware to perform certain operations. Scalar hardware may not feature sufficient performance for some applications (e.g., to rapidly estimate a channel impulse response to recover a transmitted signal by a mobile device within a communication system). Vector hardware may be computationally robust, but may be complex to implement.

III. SUMMARY

Communication systems may use a code division multiple access (CDMA) technique to enable a network device to communicate with multiple mobile devices over a wireless channel. For example, a receiver in a CDMA communication system may correlate a data sequence of a received signal to a CDMA code (e.g., a CDMA "chip" sequence) to estimate a channel impulse response (e.g., to compute a channel estimate) associated with a wireless channel. The channel estimate may be used to recover data transmitted by a mobile device over the wireless channel, such as by using the channel estimate to compensate for effects (e.g., fading) of the wireless channel on the received signal.

Correlating the data sequence with respect to a code sequence (e.g., the CDMA "chip" sequence) to determine the channel estimate may be computationally intensive and may occur often, thus consuming processing resources of devices of a CDMA communication system. For example, a device may calculate a channel estimate h(n) according to the following equations:

$$h(n) = \sum_{l=0}^{255} r(l+n)c^*(l)$$

$$n = 0, 0.5, 1, \ldots, 31.5$$

$$h(0) = [\,r0\ \ r1\ \ \ldots\ \ r255\,]\cdot[\,c0\ \ c1\ \ \ldots\ \ c255\,]$$

$$h(1) = [\,r1\ \ r2\ \ \ldots\ \ 256\,]\cdot[\,c0\ \ c1\ \ \ldots\ \ c255\,]$$

$$\ldots$$

$$h(31) = [\,r31\ \ r32\ \ \ldots\ \ 286\,]\cdot[\,c0\ \ c1\ \ \ldots\ \ c255\,]$$

In the foregoing equations, r indicates a data sample vector, c indicates a code sequence vector, c* indicates a complex conjugate of the code sequence vector, [r].[c] indicates a dot product between r and c, and n indicates a time lag, as described further below.

A device in accordance with the present disclosure "splices" data samples of a data sequence and "shifts" (e.g., rotates) code samples of a code sequence instead of shifting the data samples. Shifting the code samples instead of the data samples may avoid certain complex computations and may enable channel estimation using simplified vector hardware. For example, shifting the code samples may be simpler than shifting the data samples when each data sample includes a sixteen-bit vector and each code sample includes a two-bit vector, as explained further below.

In a particular embodiment, an apparatus includes selection logic configured to select a first subset of a first set of samples stored at a first set of registers. The first subset includes a first sample stored at a first register of the first set of registers and further includes a second sample stored at a second register of the first set of registers. The apparatus further includes shift logic configured to shift a second set of samples stored at a second set of registers. The apparatus further includes a channel estimator configured to generate a first value associated with a channel estimate based on the first subset and further based on a second subset of the shifted second set of samples.

In another particular embodiment, a method of computing a channel estimate includes storing a first set of samples in a first set of registers and storing a second set of samples in a second set of registers. The method further includes selecting a first subset of the first set of samples. The first subset is selected according to an offset value and includes a first sample of the first set of samples and a second sample of the first set of samples. The first sample is stored at a first register of the first set of registers and the second sample is stored at a second register of the first set of registers. The method further includes correlating the first subset of the first set of samples with the second set of samples to generate a first value associated with the channel estimate. In response to generating the first value, the second set of samples is shifted according to a step value to generate a shifted second set of samples.

In another particular embodiment, an apparatus includes means for selecting a first subset of a first set of samples stored at a first set of registers. The first subset includes a first sample stored at a first register of the first set of registers and further includes a second sample stored at a second register of the first set of registers. The apparatus further includes means for shifting a second set of samples stored at a second set of registers to generate a shifted second set of samples. The apparatus further includes means for generating a first value associated with a channel estimate based on the first subset and further based on a second subset of the shifted second set of samples.

In another particular embodiment, a computer-readable storage medium stores instructions that are executable by a processor to cause a radio frequency (RF) interface to perform operations that include storing a first set of samples in a first set of registers and storing a second set of samples in a second set of registers. The operations further include selecting a first subset of the first set of samples. The first subset is selected according to an offset value and includes a first sample of the first set of samples and a second sample of the first set of samples. The first sample is stored at a first register of the first set of registers and the second sample is stored at a second register of the first set of registers. The operations further include correlating the first subset of the first set of samples with the second set of samples to generate a first value associated with the channel estimate. The operations further include, in response to generating the first value, shifting the second set of samples according to a step value to generate a shifted second set of samples.

One particular advantage provided by at least one of the disclosed embodiments is computation of a channel estimate by shifting code samples (e.g., instead of shifting data samples). Shifting the code samples instead of the data samples may avoid certain complex computations and may enable channel estimation using simplified vector hardware. Because each data sample may include a sixteen-bit vector and each code sample may include a two-bit vector, shifting the code samples instead of shifting the data samples may enable simplified hardware design and lower power consumption as compared to devices that shift data samples. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
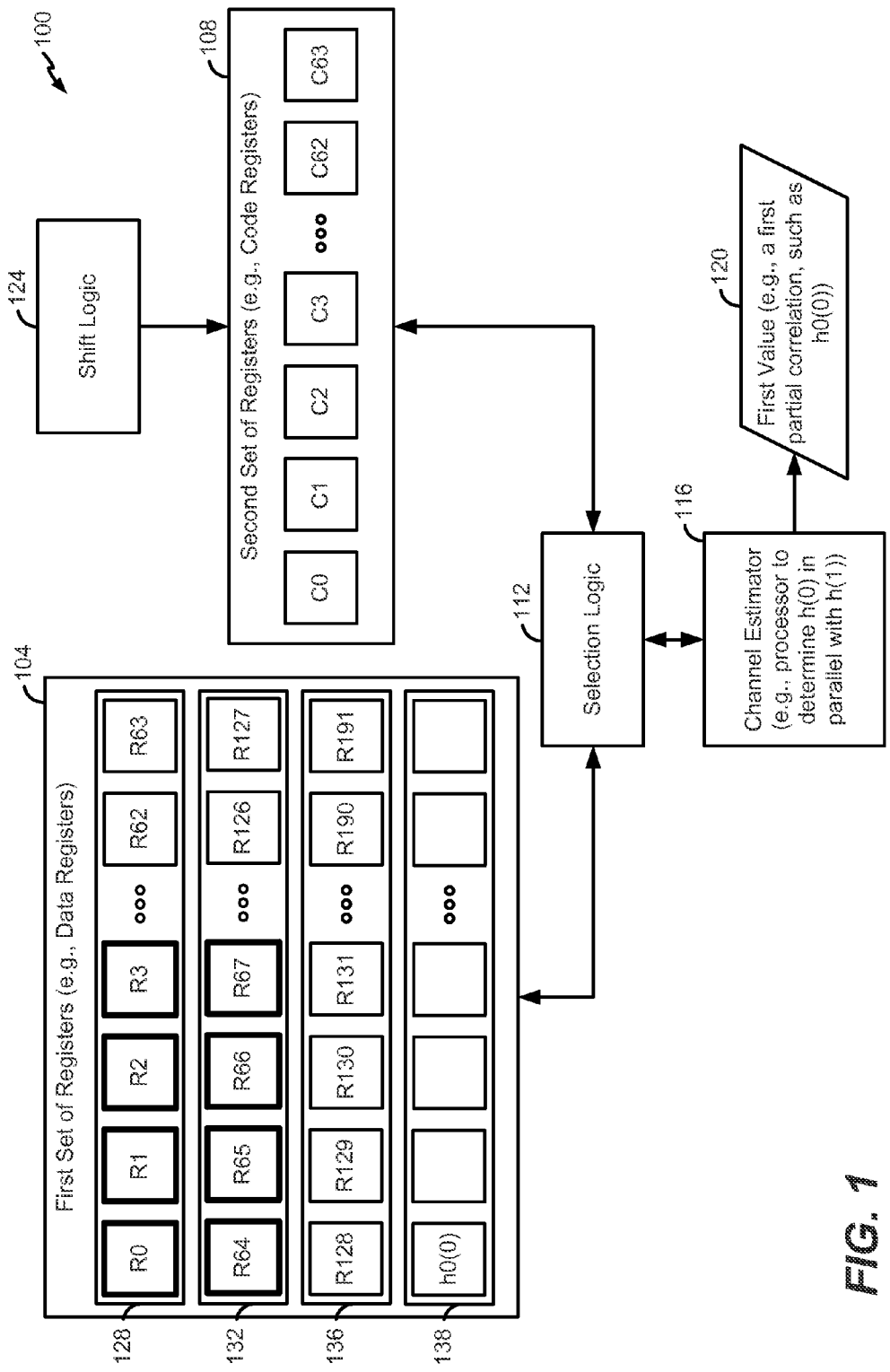
FIG. 1 is a block diagram of a particular illustrative embodiment of a device at a first particular time of operation.

Referring to FIG. 1, a particular illustrative embodiment of a device at a first particular time of operation is depicted and generally designated 100. In a particular embodiment, the device 100 corresponds to a portion of a radio frequency (RF) interface, such as a modem. The device 100 may correspond to a vector machine that performs operations on vectors to determine channel estimates used to receive signals transmitted over a channel, as described further below.

The device 100 includes a first set of registers to store a first set of samples (e.g., data registers 104 to store a set of data samples) and a second set of registers to store a second set of samples (e.g., code registers 108 to store a set of code samples, such as a CDMA code sequence). The device 100 further includes selection logic 112, a channel estimator 116, and shift logic 124. The selection logic 112 is responsive to the data registers 104 and to the code registers 108. The channel estimator 116 is responsive to the selection logic 112. The code registers 108 may be responsive to the shift logic 124 to shift (e.g., shift horizontally, or "rotate") the set of code samples stored at the code registers 108, as described further below.

In the particular example of FIG. 1, the set of data samples stored in the data registers 104 includes data samples r0, r1, . . . r191. The set of code samples stored in the code registers 108 includes code samples c0, c1, . . . c63, as illustrated in FIG. 1. The example of FIG. 1 further depicts that the data registers 104 include a first data register 128, a second data register 132, and a third data register 136. The data registers 104 further include destination registers 138, which may store results of computations performed by the channel estimator 116, such as partial correlations, as described further below.

In operation, the channel estimator 116 may generate a channel estimate based on data samples and code samples selected by the selection logic 112. The channel estimate may correspond to h(n) described above. The channel estimate may include partial channel estimates, such as h(0), h(1), . . . h(31), which may each correspond to the channel estimate at a respective time. For example, h(0) may correspond to the channel estimate at a first time (i.e., n=0), h(1) may correspond to the channel estimate at a second time (i.e., n=1), and h(31) may correspond to the channel estimate at a thirty-second time (i.e., n=31).

In a particular embodiment, the channel estimate at each time is determined as a combination (e.g., a sum) of partial correlations between subsets of the set of data samples at the data registers 104 and the set of code samples at the code registers 108. A particular illustration is provided below in which a channel estimate h(0) is determined as a combination of values, such as partial correlations h0(0) and h1(0) (also referred to herein as partial products and partial channel estimates).

To determine h0(0), the selection logic 112 may select a first subset of the data samples and the code samples (or a second subset of the code samples). The selection logic 112 may provide the code samples and the first subset of the data samples to the channel estimator 116. The channel estimator 116 may generate a first value 120 (e.g., h0(0)) based on the code samples and the first subset (e.g., by computing a dot product between the code samples and the first subset). For example, the channel estimator 116 may perform a partial correlation based on the code samples and the first subset to calculate:

$$h0(0)=r0*c0+r1*c1+r2*c2+r3*c3+r64*c64+r65*c65+r66*c66+r67*c67.$$

The first value 120 may be stored at the destination registers 138. Further, a second value, such as a second partial correlation h1(0), may be determined according to:

$$h1(0)=r64*c63+r1*c0+r2*c1+r3*c2+r128*c127+r65*c64+r66*c65+r67*c66.$$

To determine h1(0), some devices may shift each of the data samples. For example, a device may shift each of the data samples left one position (i.e., so that the leftmost data sample in the first data register 128 is r1 instead of r0, and so on) and then read out the data samples beginning at the first shifted data sample (i.e., beginning at r1). However, such devices may require complex hardware to shift each of the data samples, which can be particularly difficult to implement when each of the data samples includes a large vector. In a particular embodiment, the device 100 shifts the code samples stored at the code registers 108 rather than shifting the data samples stored at the data registers 104.

Figure 2:
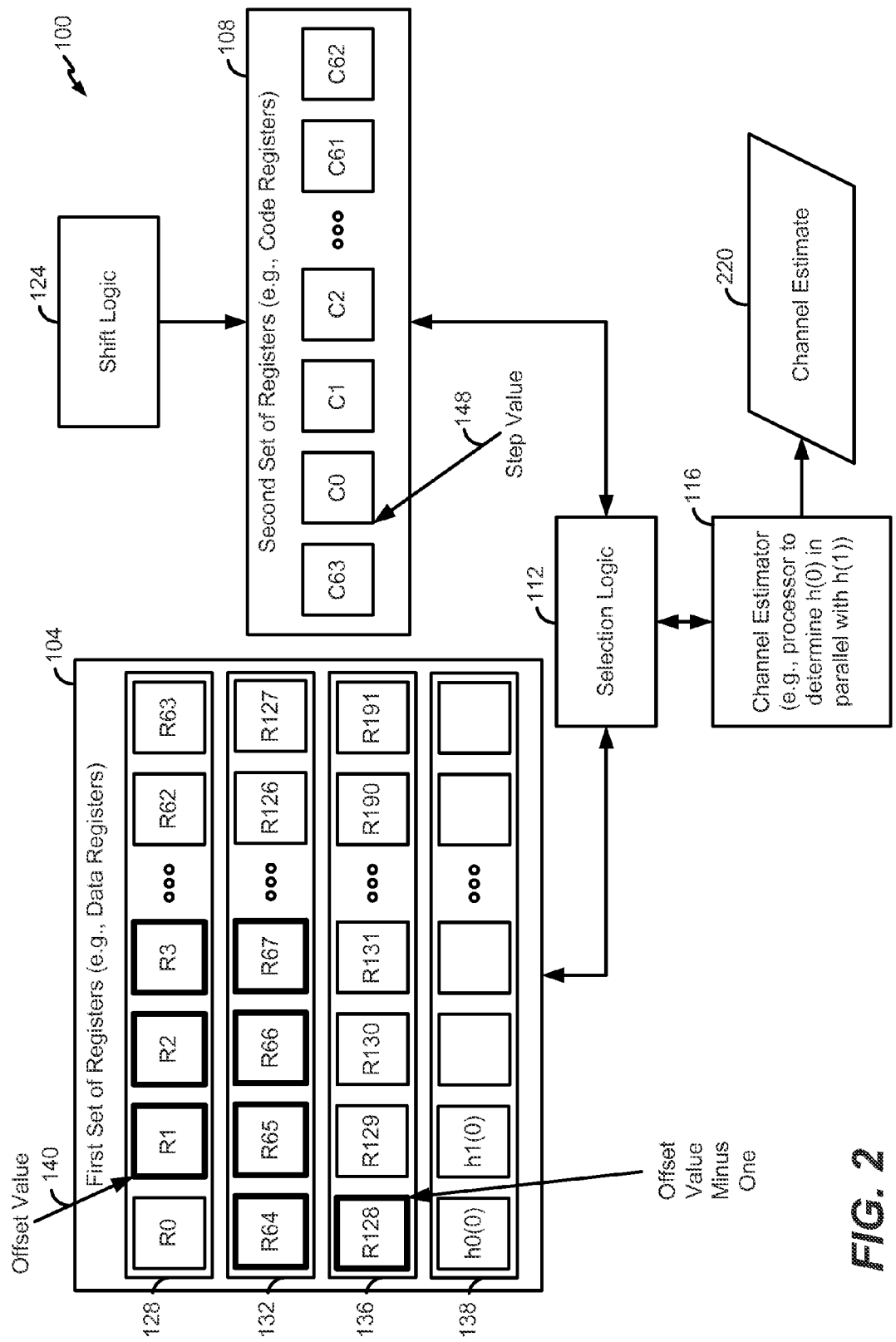
FIG. 2 is a block diagram of a particular illustrative embodiment of the device of FIG. 1 at a second particular time of operation.

For example, FIG. 2 depicts the device 100 of FIG. 1 at a second particular time of operation. In the example of FIG. 2, the code samples of the code registers 108 are shifted instead of the data samples. Thus, FIG. 2 depicts that the shift logic 124 has left-shifted the set of code samples according to a step value 148. In FIG. 2, the step value 148 is equal to one. Thus, each of the set of code samples is right-shifted one position, so that the leftmost sample is c63 and the rightmost sample is c62. Accordingly, the channel estimator 116 may determine h1(0) based in part on the shifted set of code samples (e.g., c63, c0, c1, ... c62). Further, in FIG. 2, the selection logic 112 selects a second subset of the set of the data values (e.g., a predetermined number of consecutive samples) based on an offset value 140. In the example of FIG. 2, the offset value 140 is equal to one (i.e., one data sample, r0, has been "skipped" to select the second subset). Depending on the particular application, the offset value 140 may be a different value.

Continuing with the above example, the channel estimator 116 may compute a second value (e.g., h1(0)) based on the shifted code samples (or a subset of the shifted code samples) and further based on the second subset such that:

$$h1(0)=r64*c63+r1*c0+r2*c1+r3*c2+r128*c127+\\r65*c64+r66*c65+r67*c66.$$

The second value may be stored at the destination registers 138. By shifting code samples of the code registers 108 instead of data samples of the data registers 104, large shifting operations of the data samples may be avoided. For example, when each of the data samples includes a sixteen-bit data vector and each of the code samples includes a two-bit code vector, shifting the code samples may avoid large shifting operations associated with shifting the large data samples. In a particular embodiment, the code registers 108 store a CDMA "chip sequence" of two-bit vectors, where each of the two-bit vectors indicates a respective value of 1, −1, sqrt(−1), or −sqrt(−1). Alternatively, each of the two-bit vectors may respectively indicate 1+sqrt(−1), 1−sqrt(−1), −1+sqrt(−1), or −1−sqrt(−1), or another combination of values.

Further, because the selection logic 112 can select data samples in multiple consecutive registers, data samples may be selected without shifting or moving the data samples (e.g., into a single register), thus simplifying operation. For example, non-contiguous data samples may be selected (e.g., R1 and R64) without moving the data samples (e.g., without adding R64 to the contents of the first data register 128 and then selecting the entire contents of the first data register 128). By selecting non-contiguous data samples, certain conventional circuitry, such as a "tapped delay line," may be avoided (e.g., a large circuit to shift or overwrite data values at the data registers 104 may be avoided).

Additional partial correlations (e.g., h2(0), h3(0), ... h15(0)) may be generated in a similar fashion. The channel estimator 116 may combine the partial correlations (e.g., h0(0), h1(0)) ... h15(0)) to determine a channel estimate 220 at a first time (e.g., to determine h(0), as described above). Similarly, the channel estimator 116 may combine additional partial channel estimates (e.g., h0(1), h1(1), ... h5(1)) to determine the channel estimate 220 at a second time (i.e., h(1)). The channel estimate 220 at the first time may indicate a first response of a channel at the first time, and the channel estimate 220 at the second time may indicate a second response of the channel at the second time (e.g., a time "lag" from the first time to the second time).

The offset value 140 and the step value 148 are used by the selection logic 112 to select contents of particular registers of the data registers 104. The offset value 140 and the step value 148 may indicate register locations corresponding to the particular time for which the channel estimate 220 is to be estimated. For example, at the time n=0, the offset value 140 and the step value 148 may each have a value of zero indicating a $0^{th}$ register location the data registers 104 and the code registers 108, respectively. At the time n=1, the offset value 140 and the step value 148 may each have a value of one indicating a $1^{st}$ register location the data registers 104 and the code registers 108, respectively. Further, the offset value 140 and the step value 148 may correspond to a number of bits of the data samples and a number of bits of the code samples. In the particular example of FIG. 2, the time lag is equal to one (i.e., from the first time to the second time), the offset value 140 is equal to sixteen bits (i.e., r0 to r1 spans sixteen bits), and the step value 148 is equal to two bits (i.e., from c63 to c0 spans two bits).

In connection with FIG. 2, the second subset includes data samples beginning at a register corresponding to the offset value 140 in the first data register 128 (i.e., at r1) and "wrapping around" through the offset value 140 minus one in the third data register 136 (i.e., to r128). Thus, the second subset is selected by choosing data samples beginning at the offset value 140 (e.g., an $n^{th}$ column or "lane") through the end sample of the first data register 128 (e.g., the "maximum" of the register, which corresponds to r63 in FIG. 2) and "wrapping around" from the beginning sample of the third data register 136 (i.e., r128) to the offset value 140 minus one (i.e., an n−1 column or "lane," which corresponds to one minus one, or zero, in the particular example of FIG. 2). Thus, a predetermined number of consecutive data samples are read from the data registers 104 beginning at the offset value 140 in one of the data registers (i.e., the first data register 128) and ending at the offset value 140 minus one in another of the data registers 104 (i.e., the third data register 136). Thus, the selection logic 112 may select the second subset by "splicing" data samples from multiple consecutive registers of the data registers 104 based on the offset value 140.

In a particular illustrative embodiment, the channel estimator 116 includes a processor configured to determine the channel estimate 220 for different time lags in parallel. For example, the channel estimate 220 at the first time (i.e., h(0)) (or a portion thereof) may be determined in parallel with the channel estimate 220 at the second time (i.e., h(1)) (or a portion thereof) by executing a single instruction at the processor. To further illustrate, the processor may execute the single instruction to determine partial correlations in parallel (e.g., to determine h0(1) in parallel with h1(1)).

In at least one alternative embodiment, the second set of samples may include a second set of data samples instead of code samples. For example, the second set of data samples may be used in applications where the channel estimator 116 performs covariance calculations (e.g., instead of correlation calculations) to generate the channel estimate 220. Accordingly, the destination registers 138 may be configured to temporarily store partial correlations (e.g., h0(0), h1(0), ... h15(0)), results of covariance calculations, or a combination thereof. In a particular embodiment, each column (e.g., "lane") of the first set of registers has a corresponding destination register to store a partial correlation. Continuing with the example of FIG. 2, a first destination register may correspond to the first lane of the first set of registers (i.e., the lane storing r0, r64, and r128) and may store the first partial correlation h0(0). As another example, a second destination register may correspond to the second lane of the first set of registers (i.e., the lane storing r1, r65, and r129) and may store the second partial correlation h1(0). The destination registers may temporarily store the partial correlations h0(0), h1(0), ... h15(0) until the partial correlations h0(0), h1(0), ... h15(0) are combined to generate h(0), at which time partial correlations corresponding to h(1) are written to the destination registers (i.e., h0(1), h1(1), ... h15(1)).

The data registers 104 and the code registers 108 may be of appropriate sizes for a particular application. For example, the registers 104, 108 may be configured to store 128 samples. In a particular embodiment, the code registers 108 include two registers each configured to store 64 samples (e.g., a fourth register configured to store c0 ... c63, as shown in FIGS. 1 and 2, and a fifth register (not shown) that is configured to store c64 ... c127). The shift logic 124 may be further configured to shift the code samples by shifting samples of both the fourth register and the fifth register (e.g., to left-shift c63 relative to c0, as depicted in FIGS. 1 and 2, and further to left-shift c127 relative to c64). Alternatively, the registers 104, 108 may be configured to store 256 samples, or another number of samples. If the registers 104, 108 store 256 samples, operations can be "broken" up into two sets of 128 operations.

Figure 3A:
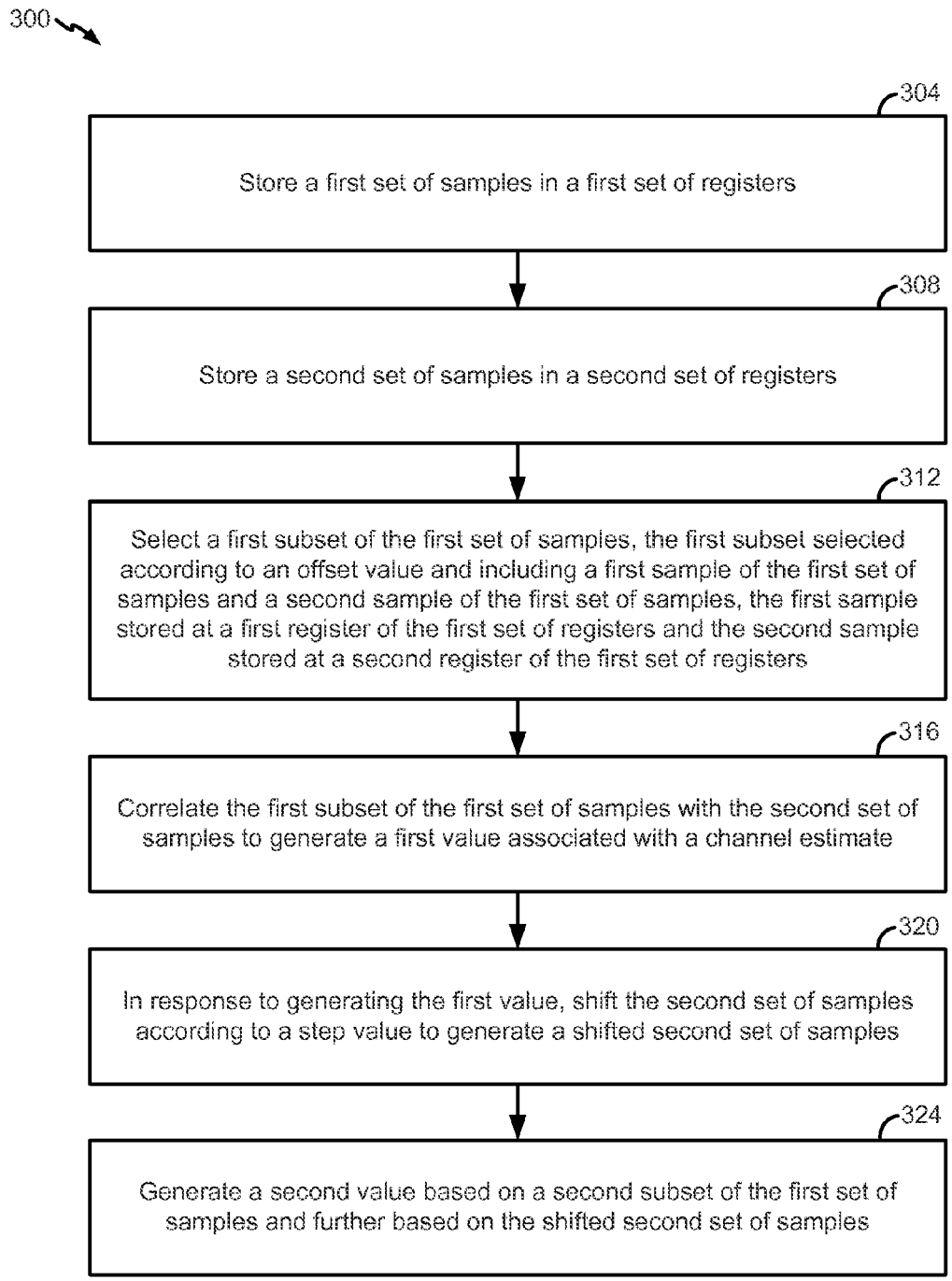
FIG. 3A is a flow chart of a particular illustrative embodiment of a method performed by the device of FIG. 1.

Referring to FIG. 3A, a particular illustrative embodiment of a method performed by the device 100 is depicted and generally designated 300. Operations of the method 300 may be performed by the channel estimator 116.

The method 300 includes storing a first set of samples (e.g., data samples associated with a received signal) in a first set of registers, at 304. The first set of samples may correspond to the data samples described with reference to FIGS. 1 and 2 (i.e., r0, r1, ... r191). The first set of registers may correspond to the data registers 104 described with reference to FIGS. 1 and 2.

At 308, the method 300 further includes storing a second set of samples (e.g., code samples associated with a code sequence, such as a CDMA "chip" sequence that includes unity values, such as 1 and −1 or sqrt(−1) and −sqrt(−1)) in a second set of registers. The second set of samples may correspond to the code samples described with reference to FIGS. 1 and 2 (i.e., c0, c1, ... c63). The second set of registers may correspond to the code registers 108 described with reference to FIGS. 1 and 2.

At 312, the method 300 further includes selecting a first subset of the first set of samples. The first subset may correspond to r0, r1, r2, r3, r64, r65, r66, r67, as described with reference to FIG. 1. The first subset may be selected by the selection logic 112 without shifting the first set of samples. The first subset is selected according to an offset value and includes a first sample of the first set of samples and a second sample of the first set of samples. The first sample is stored at a first register of the first set of registers, and the second sample stored at a second register of the first set of registers. For example, the first sample may be stored at one of the data registers 128, 132, 136 and the second sample may be stored at another of the data registers 128, 132, 136. The offset value may correspond to the offset value 140 of FIG. 2.

At 316, the method 300 further includes correlating (e.g., using a dot product operation) the first subset of the first set of samples with the second set of samples (or a second subset of the second set of samples) to generate a first value associated with a channel estimate. Correlating the first subset with the second set of samples may be performed by the channel estimator 116. The first value may correspond to the first value 120 (e.g., h0(0)) described with reference to FIG. 1. The channel estimate may correspond to the channel estimate 220 of FIG. 2. The first value may be stored at the destination registers 138.

At 320, in response to generating the first value, the method 300 further includes shifting the second set of samples according to a step value to generate a shifted second set of samples. The step value may correspond to the step value 148 of FIG. 2. The second set of samples may be shifted by the shift logic 124 of FIGS. 1 and 2.

At 324, a second value is generated based on a second subset of the first set of samples and further based on the shifted second set of samples. For example, the second value may correspond to h1(0) and may be generated as described with reference to FIG. 2.

Figure 3B:
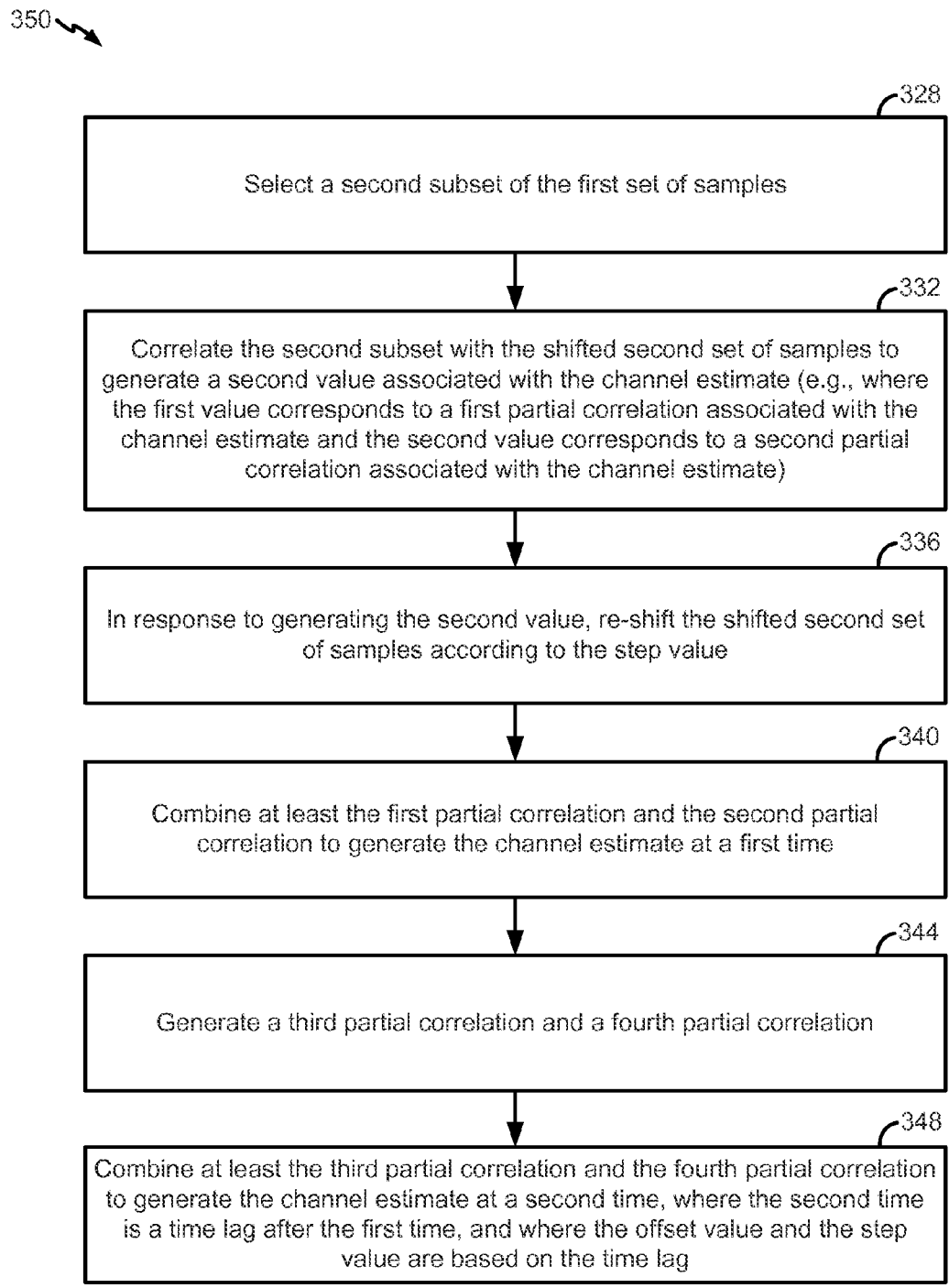
FIG. 3B is a flow chart of a particular illustrative embodiment of another method performed by the device of FIG. 1.

Referring to FIG. 3B, a particular illustrative embodiment of another method performed by the device 100 is depicted and generally designated 350. Operations of the method 350 may be performed by the channel estimator 116 and may be performed in response to performing the method 300 of FIG. 3A.

The method 350 includes selecting a second subset of the first set of samples, at 328. The second subset may correspond to r1, r2, r3, r64, r65, r66, r67, r128, as described with reference to FIG. 2. The second subset may be selected by the selection logic 112 without shifting the first set of samples.

At 332, the second subset is correlated (e.g., using a dot product operation) with the shifted second set of samples (or a second subset of the shifted second set of samples) to generate a second value associated with the channel estimate. The second value may correspond to h1(0), as described above, and may be stored at the destination registers 138. The first value and the second value may correspond to partial correlations associated with the channel estimate for a first time n=0.

At 336, in response to generating the second value, the shifted second set of samples is re-shifted according to the step value. For example, the shifted second set of samples may be re-shifted to generate a sequence c62, c63, c0, c1, c2, ... c61 at the code registers 108. The method 350 may include generating additional partial channel estimates for the first time n=0, such as h2(0), h3(0), ... h15(0) (not shown in FIG. 3B).

At 340, the method 350 further includes combining at least the first partial correlation and the second partial correlation to generate the channel estimate at the first time. For example, h0(0), h1(0), ... h15(0) may be combined (e.g., added) to generate the channel estimate at the first time n=0 (i.e., to generate h(0)).

At 344, a third partial correlation and a fourth partial correlation are generated. The third partial correlation and the fourth partial correlation may correspond to h0(1) and h1(1), respectively, which may correspond to a second time n=1. Additional partial correlations may be generated for the second time n=1, such as h2(1), h3(1), ... h15(1). The method 350 further includes combining at least the third partial correlation and the fourth partial correlation (e.g., by adding h0(1), h1(1), h2(1), ... h15(1)) to generate the channel estimate at the second time n=1 (i.e., to generate h(1)), at 348. The second time n=1 is a "time lag" after the first time n=0 and the offset value and the step value are based on the time lag (i.e., the offset value and the step value are selected based on the time lag).

Computation of channel estimates using the methods 300, 350 of FIGS. 3A and 3B may reduce complexity of computations and may enable simplified vector hardware. For example, shifting code samples instead of shifting data samples may avoid certain complex computations when each data sample includes a sixteen-bit vector and each code sample includes a two-bit vector. Thus, shifting code samples instead of shifting data samples may enable simplified hardware design and lower power consumption as compared to devices that shift data samples.

Figure 4:
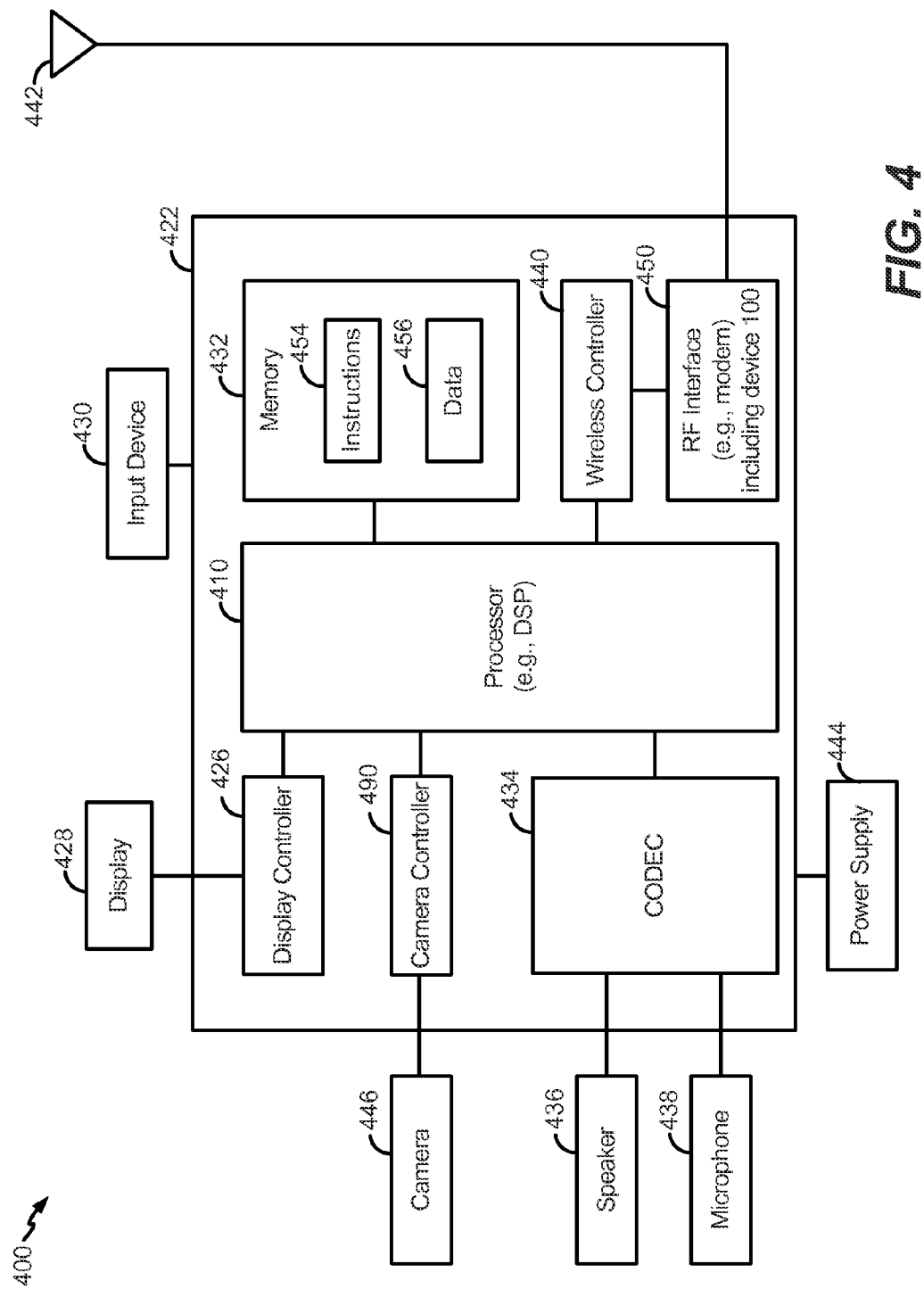
FIG. 4 is a block diagram of communication device that includes the device of FIG. 1.

Referring to FIG. 4, a block diagram of a particular illustrative embodiment of a communication device is depicted and generally designated 400. The communication device 400 may include a processor 410, such as a digital signal processor (DSP). The processor 410 may be coupled to a computer-readable storage medium, such as a memory 432 (e.g., a non-transitory computer-readable medium). The memory 432 may store instructions 454 executable by the processor 410, data 456 accessible to the processor 410, or a combination thereof.

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. A camera 446 may be coupled to a camera controller 490. The camera controller 490 may be coupled to the processor 410.

FIG. 4 also indicates that a wireless controller 440 can be coupled to the processor 410. The wireless controller may be further coupled to an antenna 442 via a radio frequency (RF) interface 450. The RF interface 450 may include the device 100 of FIGS. 1 and 2. In a particular embodiment, the device 100 corresponds to a modem (or a portion of a modem) included in the RF interface 450. The wireless controller 440, the RF interface 450, and the antenna 442 may be used to receive signals, such as signals transmitted via a CDMA network. In a particular embodiment, the data registers 104 store data samples associated with the received signals and the code registers 108 store a code sequence associated with the CDMA network (e.g., a CDMA "chip" sequence).

In a particular embodiment, the processor 410, the memory 432, the display controller 426, the camera controller 490, the CODEC 434, the wireless controller 440, and the RF interface 450 are included in the system-in-package or system-on-chip device 422. An input device 430 and a power supply 444 may be coupled to the system-on-chip device 422.

Moreover, in a particular embodiment, and as illustrated in FIG. 4, the display 428, the input device 430, the camera 446, the speaker 436, the microphone 438, the antenna 442, and the power supply 444 are external to the system-on-chip device 422. However, each of the display 428, the input device 430, the camera 446, the speaker 436, the microphone 438, the antenna 442, and the power supply 444 can be coupled to a component of the system-on-chip device, such as to an interface or to a controller.

In connection with the described embodiments, a computer-readable storage medium (e.g., the memory 432) stores instructions (e.g., the instructions 454) that are executable by a processor (e.g., the processor 410) to cause a radio frequency (RF) interface (e.g., the RF interface 450) to perform operations, such as one or more operations corresponding to the methods 300, 350 of FIGS. 3A and 3B. In a particular embodiment, the operations include storing a first set of samples (e.g., r0, r1, . . . r191, which may correspond to a signal received via the antenna 442 and the RF interface 450) in a first set of registers (e.g., the data registers 104). The operations further include storing a second set of samples (e.g., c0, c1, . . . c63, which may correspond to a code sequence, such as a CDMA code sequence) in a second set of registers (e.g., the code registers 108). The operations further include selecting a first subset (e.g., the first subset described with reference to FIG. 2) of the first set of samples. The first subset is selected according to an offset value (e.g., the offset value 140) and includes a first sample of the first set of samples and a second sample of the first set of samples. The first sample is stored at a first register of the first set of registers (e.g., one of the data registers 128, 132, 136), and the second sample is stored at a second register of the first set of registers (e.g., another of the data registers 128, 132, 136). The operations further include correlating the first subset of the first set of samples with the second set of samples to generate a first value (e.g., a partial correlation, such as h0(0)) associated with the channel estimate. The operations further include, in response to generating the first value, shifting the second set of samples according to a step value to generate a shifted second set of samples (e.g., to generate c63, c0, . . . c62 as depicted in FIG. 2).

In connection with the described embodiments, an apparatus (e.g., the system-on-chip device 422) includes means for selecting (e.g., the selection logic 112) a first subset of a first set of samples (e.g., r0, r1, . . . r191) stored at a first set of registers (e.g., the data registers 104). The first subset includes a first sample stored at a first register (e.g., one of the data registers 128, 132, 136) of the first set of registers and further includes a second sample stored at a second register (e.g., another of the data registers 128, 132, 136) of the first set of registers. The apparatus further includes means for shifting (e.g., the shift logic 124) a second set of samples (e.g., c0, c1, . . . c63) stored at a second set of registers (e.g., the code registers 108) to generate a shifted second set of samples (e.g., c63, c0, c1 . . . c62). The apparatus further includes means for generating a first value (e.g., a partial correlation, such as h0(0)) associated with a channel estimate based on the first subset and further based on a second subset of the shifted second set of samples.

Those of skill in the art will appreciate that the foregoing disclosed devices and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as the device 100, the communication device 400, or a combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
   selection logic configured to select a first subset of a first set of samples stored at a first set of registers based on an offset value corresponding to a number of the first set of samples, the offset value corresponding to a step value, the first subset including a first sample stored at a first register of the first set of registers and further including a second sample stored at a second register of the first set of registers, wherein the first register and the second register are different registers;
   shift logic configured to shift a second set of samples stored at a second set of registers based on the step value; and
   a channel estimator configured to generate a first value associated with a channel estimate based on the selected first subset and further based on a second subset of the shifted second set of samples.

2. The apparatus of claim 1, wherein the first value is a first partial correlation between the selected first subset and the second subset of the shifted second set of samples, and wherein the channel estimator is further configured to generate the channel estimate by combining the first partial correlation and at least a second partial correlation.

3. The apparatus of claim 1, wherein the selection logic is further configured to select the first subset without shifting the first set of samples, wherein each of the first set of samples includes a sixteen-bit vector, and wherein each of the second set of samples includes a two-bit vector associated with a code division multiple access (CDMA) code.

4. The apparatus of claim 3, wherein each two-bit vector has a value of 1, −1, sqrt(−1), or −sqrt(−1).

5. The apparatus of claim 1, wherein the channel estimator is further configured to generate the first value by performing a dot product operation on the selected first subset and the second subset of the shifted second set of samples.

6. The apparatus of claim 1, wherein the first set of registers further includes a third register, and wherein the selected first subset further includes a third sample stored at the third register.

7. The apparatus of claim 1, wherein the first set of registers and the second set of registers are each configured to store 128 samples.

8. The apparatus of claim 7, wherein the second set of registers includes a third register configured to store 64 values and further includes a fourth register configured to store 64 values, and wherein the shift logic is further configured to shift values of the second set of samples stored both at the third register and the fourth register.

9. The apparatus of claim 1, wherein the first set of registers and the second set of registers are each configured to store 256 values.

10. The apparatus of claim 1, wherein the first set of samples includes a set of data samples associated with a received signal, wherein the second set of samples includes a set of code samples associated with a code sequence, and wherein the channel estimator is further configured to determine the channel estimate by determining a correlation between the set of data samples and the set of code samples.

11. The apparatus of claim 1, wherein the first set of samples includes a first set of data samples associated with a received signal, wherein the second set of samples includes a second set of data samples associated with the received signal, and wherein the channel estimator is further configured to determine the channel estimate by determining a covariance between the first set of data samples and the second set of data samples.

12. The apparatus of claim 1, further comprising a modem, wherein the shift logic, the selection logic, and the channel estimator are integrated within the modem.

13. The apparatus of claim 1, wherein the first register and the second register are each configured to store multiple samples.

14. A method comprising:
    storing a first set of samples in a first set of registers;
    storing a second set of samples in a second set of registers;
    selecting a first subset of the first set of samples, the first subset selected according to an offset value corresponding to a number of the first set of samples, the offset value corresponding to a step value, the first subset including a first sample of the first set of samples and a second sample of the first set of samples, the first sample stored at a first register of the first set of registers and the second sample stored at a second register of the first set of registers;
    correlating the selected first subset of the first set of samples with the second set of samples to generate a first value associated with a channel estimate, the second set of samples shifted based on the step value; and
    in response to generating the first value, shifting the second set of samples according to the step value to generate a shifted second set of samples.

15. The method of claim 14, further comprising:
    selecting a second subset of the first set of samples;
    correlating the second subset with the shifted second set of samples to generate a second value associated with the channel estimate; and
    in response to generating the second value, re-shifting the shifted second set of samples according to the step value.

16. The method of claim 15, wherein the first value corresponds to a first partial correlation associated with the channel estimate, wherein the second value corresponds to a second partial correlation associated with the channel estimate, and further comprising combining at least the first partial correlation and the second partial correlation to generate the channel estimate at a first time.

17. The method of claim 16, further comprising:
    generating a third partial correlation;
    generating a fourth partial correlation; and
    combining at least the third partial correlation and the fourth partial correlation to generate the channel estimate at a second time, wherein the second time is a time lag after the first time, and wherein the offset value and the step value are based on the time lag.

18. The method of claim 17, further comprising executing a single instruction that causes a processor to determine the channel estimate at the first time in parallel with determining the channel estimate at the second time.

19. The method of claim 14, further comprising selecting a particular sample in the first register as the first sample, wherein the particular sample is offset from a left-most sample in the first register by the offset value.

20. An apparatus comprising:
  means for selecting a first subset of a first set of samples stored at a first set of registers based on an offset value corresponding to a number of the first set of samples, the offset value corresponding to a step value, the first subset including a first sample stored at a first register of the first set of registers and further including a second sample stored at a second register of the first set of registers, wherein the first register and the second register are different registers;
  means for shifting a second set of samples stored at a second set of registers based on the step value to generate a shifted second set of samples; and
  means for generating a first value associated with a channel estimate based on the selected first subset and further based on a second subset of the shifted second set of samples.

21. The apparatus of claim 20, wherein the first subset is selected without shifting any samples of the first set of samples.

22. The apparatus of claim 20, wherein the offset value corresponds to an offset of a particular number of samples.

23. A non-transitory computer-readable storage medium storing instructions that are executable by a processor to cause a radio frequency (RF) interface to:
  store a first set of samples in a first set of registers;
  store a second set of samples in a second set of registers;
  select a first subset of the first set of samples, the first subset selected according to an offset value corresponding to a number of the first set of samples, the offset value corresponding to a step value, the first subset including a first sample of the first set of samples and a second sample of the first set of samples, the first sample stored at a first register of the first set of registers and the second sample stored at a second register of the first set of registers;
  correlate the selected first subset of the first set of samples with the second set of samples to generate a first value associated with a channel estimate, wherein the second set of samples is shifted based on the step value; and
  in response to generating the first value, shift the second set of samples according to a step value to generate a shifted second set of samples.

24. The non-transitory computer-readable storage medium of claim 23, wherein the instructions are further executable by the processor to cause the RF interface to:
  select a second subset of the first set of samples;
  correlate the selected second subset with the shifted second set of samples to generate a second value associated with the channel estimate; and
  in response to generating the second value, re-shift the shifted second set of samples according to the step value.

25. The non-transitory computer-readable storage medium of claim 23, wherein the first value corresponds to a first partial correlation associated with the channel estimate, wherein the second value corresponds to a second partial correlation associated with the channel estimate, and wherein the operations further comprise combining at least the first partial correlation and the second partial correlation to generate the channel estimate at a first time.

26. The non-transitory computer-readable storage medium of claim 25, wherein the instructions are further executable by the processor to cause the RF interface to:
  generate a third partial correlation;
  generate a fourth partial correlation; and
  combine at least the third partial correlation and the fourth partial correlation to generate the channel estimate at a second time,
  wherein the second time is a time lag after the first time, and wherein the offset value and the step value are based on the time lag.

* * * * *